US012326018B2

(12) United States Patent
Reder et al.

(10) Patent No.: US 12,326,018 B2
(45) Date of Patent: Jun. 10, 2025

(54) DEVICE FOR UNLOCKING A VEHICLE DOOR

(71) Applicant: Dr. Ing. h.c. F. Porsche Aktiengesellschaft, Stuttgart (DE)

(72) Inventors: Gerhard Reder, Moensheim (DE); Stefan Schmitz, Stuttgart (DE)

(73) Assignee: Dr. Ing. h.c. F. Porsche Aktiengesellschaft (DE)

(*) Notice: Subject to any disclaimer, the term of this patent is extended or adjusted under 35 U.S.C. 154(b) by 48 days.

(21) Appl. No.: 18/232,407

(22) Filed: Aug. 10, 2023

(65) Prior Publication Data

US 2024/0060337 A1 Feb. 22, 2024

(30) Foreign Application Priority Data

Aug. 19, 2022 (DE) ..................... 10 2022 121 042.1

(51) Int. Cl.

| | |
|---|---|
| ***E05B 79/20*** | (2014.01) |
| ***E05B 81/04*** | (2014.01) |
| ***E05B 81/42*** | (2014.01) |
| ***E05B 81/90*** | (2014.01) |
| ***E05B 85/12*** | (2014.01) |

(52) U.S. Cl.
CPC .............. *E05B 79/20* (2013.01); *E05B 81/04* (2013.01); *E05B 81/42* (2013.01); *E05B 81/90* (2013.01); *E05B 85/12* (2013.01)

(58) Field of Classification Search
CPC ........... E05B 81/90; E05B 79/20; E05B 83/26
See application file for complete search history.

(56) References Cited

U.S. PATENT DOCUMENTS 3,428,350 A * 2/1969 Trammell, Jr. .......... E05B 79/20 292/336.3
5,236,233 A * 8/1993 Fukumoto ............... E05B 79/20 292/171
5,662,369 A * 9/1997 Tsuge ..................... B60N 2/366 292/225

(Continued)

FOREIGN PATENT DOCUMENTS

CN 109695385 A 4/2019
CN 209924671 A 1/2020

(Continued)

OTHER PUBLICATIONS

Computer Generated Translation for WO 2021182142, Generated on Nov. 22, 2024, https://worldwide.espacenet.com/ (Year: 2024).*

*Primary Examiner* — Alyson M Merlino
(74) *Attorney, Agent, or Firm* — Buchanan Ingersoll & Rooney PC

(57) ABSTRACT

A device for door unlocking for a vehicle, having an actuating element, including an actuating portion and a flexibly unwindable band portion, which is connected to a Bowden cable. The Bowden cable and the actuating element are arranged on a base plate and/or a door, and the actuating element is connected to a rotatably arranged loop lever in such a way that, when the loop lever is rotated by the actuating element, the Bowden cable connected to the loop lever is movable. The loop lever includes a (preferably) circular loop lever portion, against which the actuating element partially abuts.

17 Claims, 5 Drawing Sheets

(56) References Cited

U.S. PATENT DOCUMENTS

| | | | | |
|---|---|---|---|---|
| 8,936,284 | B2 * | 1/2015 | Konchan | E05B 81/90 292/201 |
| 11,834,872 | B2 * | 12/2023 | Guerin | E05B 81/90 |
| 2022/0074241 | A1 * | 3/2022 | Kubo | E05B 81/90 |

FOREIGN PATENT DOCUMENTS

| | | | | | |
|---|---|---|---|---|---|
| CN | 211776653 | A | | 10/2020 | |
| DE | 102005045640 | A1 | * | 3/2007 | E05B 83/26 |
| DE | 102021129562 | A1 | | 5/2023 | |
| GB | 2271374 | A | * | 4/1994 | E05B 17/04 |
| KR | 20050043000 | | * | 5/2005 | E05B 79/20 |
| KR | 20210049516 | A | * | 5/2021 | E05B 79/20 |
| KR | 102664047 | B1 | * | 5/2024 | E05B 79/20 |
| WO | WO-2004033832 | A2 | * | 4/2004 | E05B 79/20 |
| WO | 2020154118 | A1 | | 7/2020 | |

* cited by examiner

DEVICE FOR UNLOCKING A VEHICLE DOOR

CROSS-REFERENCE TO RELATED APPLICATION

This application claims priority to German Patent Application No. 10 2022 121 042.1, filed Aug. 19, 2022, the content of such application being incorporated by reference herein in its entirety.

FIELD OF THE INVENTION

The present invention relates to a device for door unlocking in a vehicle.

BACKGROUND OF THE INVENTION

Door unlocking systems of vehicle doors with mechanical actuating elements are known in numerous variations. Generally, by actuating a lever-like handle, a Bowden cable is pulled, which unlocks the door. A less common variant is actuating elements with band portions, in particular with actuating loops for door unlocking. The actuating loop operates the lock Bowden cable by means of a deflection lever, or is deflected by a deflection roller, in order to directly unlock the door in very small design spaces. When the actuation is done directly via a deflection roller with a small diameter, high forces are applied for the unlocking. Due to the friction created at the deflection points, the force requirement is increased considerably, and the actuating loop also undergoes damaging stress.

CN 109695385 A, which is incorporated by reference herein, discloses an interior door actuation with an opening handle made of a soft material for the door unlocking of a vehicle door. CN 211776653 U, which is incorporated by reference herein, describes an interior door actuation with a tensile band-like opening handle for unlocking vehicle doors.

SUMMARY OF THE INVENTION

According to aspects of the invention, the device for door unlocking comprises an actuating element consisting of an actuating portion and a flexibly unwindable band portion connected to a Bowden cable. The Bowden cable and the actuating element are arranged on a base plate and/or on a door. The actuating element is connected to a rotatably arranged loop lever in such a way that, upon rotation of the loop lever by the actuating element, the Bowden cable connected to the loop lever is movable. The loop lever preferably has a circular loop lever portion, against which the band portion partially abuts. Through the abutment of the band section against the rotatable loop lever, the deflection about a component is avoided, so that no friction arises and wear on the band section is minimized as much as possible. The abutment of the band section against the loop lever and/or the partitioning of the actuating element into the actuating portion and band portion allow the use of haptically appealing materials, which have a lower component strength, for example. With the loop lever, in contrast to a deflection of the band portion, the lever arm can be enlarged so that the actuating force can be increased. The actuating element can preferably be made of a polymeric material or a textile material. This provides the operator with a comfortable haptic feeling when gripping and actuating the actuating portion. The actuating element or one of the two portions of the actuating element can also be produced from a combination of different materials. By weaving in fibers, the design or properties of the actuating element can be influenced. In order to exploit further weight-saving potentials, surrounding components or functions can be integrated into the base plate. The cover on the base plate can be used as a guide for the actuating element or for the purpose of selectively introducing design elements. In a preferred configuration, the base plate has advantageous component properties due to rib-like structures.

According to an advantageous configuration of the invention, a Bowden cable lever, which is rotatably arranged on the base plate and/or the door is connected to the loop lever via a coupling rod such that, when the loop lever is rotated by the actuating element, the Bowden cable connected to the Bowden cable lever is movable. The loop lever can be rotatable about a first loop lever axis, and the Bowden cable lever can be rotatable about a second Bowden cable lever axis. The axes of the loop lever and the Bowden cable lever can be supported with the aid of bearing bushings in order to reduce friction in the joints. With the Bowden cable lever, a second lever arm can be configured so as to further reduce the actuating force in addition to the first lever arm of the loop lever. By kinematically connecting the loop lever, the coupling rod, and the Bowden cable lever, a noticeable threshold during actuation can be integrated. The operator receives a haptic feedback as to when the door unlocking has been successfully activated. This provides an improved feeling during the unlocking process.

According to a further advantageous configuration of the invention, the actuating portion and the band portion are integrally connected. Due to the integral configuration of the actuating element, no additional connecting elements are required, and thus no weak points are present in the actuating element.

According to a further advantageous configuration of the invention, the actuating portion is configured to be loop-shaped or hook-shaped. The actuating portion can have different shapes for gripping. It can be configured as a band, cable, toggle, handle, or knob, for example. In a preferred configuration, the actuating portion can be folded over at the end for gripping the actuating element and connected in a materially locking manner by forming a first connection.

As a result, a secure connection can be created without additional intermediate elements. According to a further advantageous configuration of the invention, the band portion of the actuating element is fastened to the first loop lever axis. By using the first loop lever axis simultaneously as the rotational axis of the loop lever and as a band portion for fastening the actuating element, additional fastening elements or connecting points are omitted, so that additional weight can be saved. The band portion can be folded over at the end for fastening to the rotational axis of the loop lever and can be connected in a materially locking manner. As a result, a secure connection can be created without any additional intermediate elements.

According to a further advantageous configuration of the invention, a spring for retrieving the actuating element is arranged between the base plate and/or the door and the loop lever or the Bowden cable lever. The spring is tensioned when the actuating element is pulled and brings the actuating element back into the home position after the actuation.

According to a further advantageous configuration of the invention, a microswitch is provided, which is actuated by a rotation of the loop lever or the Bowden cable lever at a first angle such that an electrical control for lowering of the door window panes and/or an electrical door lock takes place. The actuation of the microswitch can be configured so as to electrically unlock the door prior to the mechanical unlocking. The actuation for the operator is thereby more comfortable, because the actuating element does not have to be fully pulled out, and a necessary actuating force is only applied for a short time.

According to a further advantageous configuration of the invention, upon a rotation of the loop lever or the Bowden cable lever by a second angle that is greater than the first angle, the door unlocking is carried out mechanically via the Bowden cable. For an electrical unlocking system, the mechanical unlocking function serves as an emergency release when the door unlocking system is used in the event of a failure of the microswitch or the power supply. Furthermore, additional functions can be implemented when actuating the microswitch, such as a window pane lowering when actuating the door unlocking. The mechanism of the interior door actuation, which is arranged downstream of the microswitch, can also be omitted entirely in the case of a purely mechanical lock in order to take advantage of further potential for weight savings.

According to a further advantageous configuration of the invention, the device comprises a second spring arranged on the base plate and/or on a door, having a second cam arranged on the Bowden cable lever for forming a haptic force threshold between the mechanical and electrical door unlocking systems. The second spring cooperates with the cam portion in such a way that, by applying a higher force, the second spring abutting the Bowden cable lever bottom slips over the cam portion upon rotation of the Bowden cable lever about the second Bowden cable lever axis. The second spring has a U-shaped profile. In the assembled state, the second spring is prestressed, and the closed portion of the second spring abuts against the Bowden cable lever bottom. The second cam is arranged on the Bowden cable lever bottom and has a cam portion. The cam portion has a pitch facing away from the Bowden cable lever bottom. When the loop lever is rotated, a rotational movement of the Bowden cable lever occurs about the second Bowden cable lever axis. The cam portion rotates against the closed portion of the second spring. A further rotational movement is only possible by applying a higher force. By applying the higher force, the second spring slips over the cam portion, and the lock is mechanically unlocked upon further rotation. The mechanical actuation is thereby noticeably separated from the electrical actuation. The operator receives improved haptic feedback during the actuation operation.

According to a further advantageous configuration of the invention, the coupling rod comprises at least one bend or a flexure. Due to the limited design space, a direct connection of the loop lever and the Bowden cable lever cannot always be implemented. With a bend or a flexure, the coupling rod can be better adapted to the existing design space. The coupling rod is preferably made of a metallic or a polymeric material.

BRIEF DESCRIPTION OF THE DRAWINGS

In the following, the invention will be explained in further detail with reference to several figures.

DETAILED DESCRIPTION OF THE INVENTION

Figure 1:
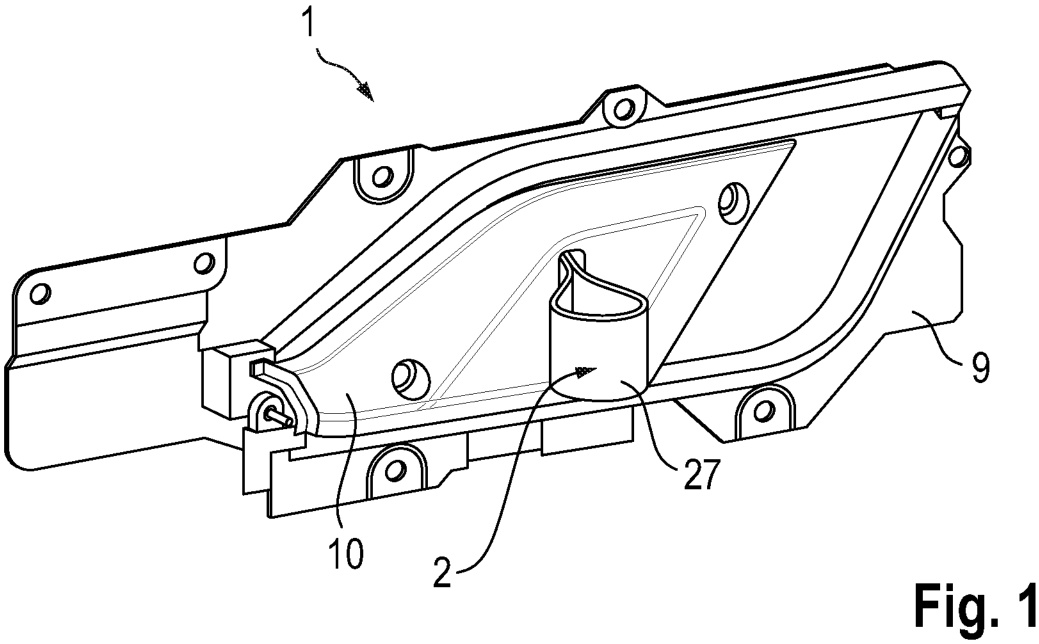
FIG. 1 is a perspective view of a device for door unlocking.

FIG. 1 shows a device (1) for door unlocking for a vehicle from the operator's perspective when it is located in the interior of the vehicle. An actuating element (2) of the device (1) for door unlocking is made of, for example, a polymeric material or a textile material. The actuating element (2) is guided through a cover (10) arranged on a base plate (9) and/or on a door.

Figure 2:
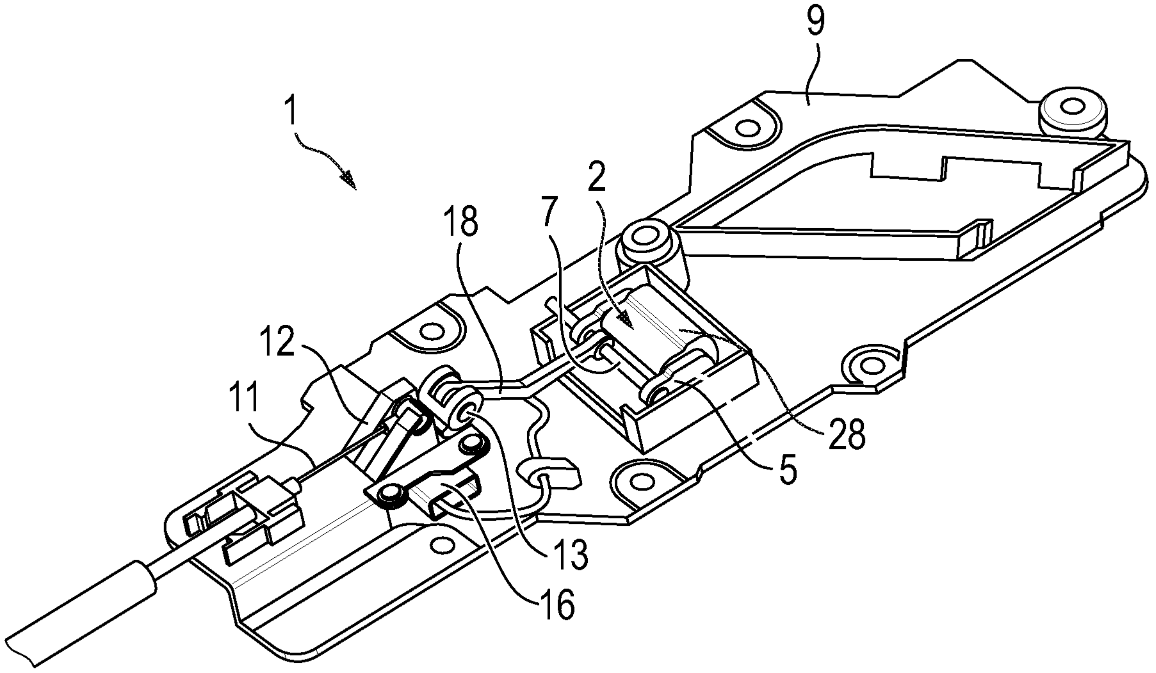
FIG. 2 is a perspective view of the device from FIG. 1 from the opposite side.

FIG. 2 shows the device from the opposite side and is composed of the actuating element (2), the base plate (9), the cover (10), a loop lever (5), a coupling rod (18), a Bowden cable lever (12), and a Bowden cable (11). The actuating element (2) is connected to the loop lever (5). The loop lever (5) is arranged on the base plate (9). The connection of the loop lever (5) to the base plate (9) and/or the door occurs via a first loop lever axis (6) extending through the loop lever (5). The fastening of the actuating element (2) occurs on the first loop lever axis (6). The loop lever (5) preferably has a circular loop lever portion (8), against which the band portion (28) partially abuts. A coupling rod (18) connects the loop lever (5) to the Bowden cable lever (12). The coupling rod (18) is made from a metallic or a polymeric material. The coupling rod (18) has a bend or a flexure, allowing the coupling rod (18) to be adapted to the existing design space. The coupling rod (18) has a rotatable connection to a second loop lever axis (7) of the loop lever (5) and a first Bowden cable lever axis (13) of the Bowden cable lever (12). The two axes (7, 13) are supported with the aid of bearing bushings (19, 20) in order to reduce the friction in the joints. The Bowden cable lever (12) is rotatably supported about the second Bowden cable lever axis (14). The second Bowden cable lever axis (14) is also supported with a bearing bushing (24) for friction minimization. The Bowden cable (11) is suspended from the Bowden cable lever (12). The coupling rod (18) connects the loop lever (5) to the Bowden cable lever (12) such that, upon rotation of the loop lever (5), the Bowden cable (11) connected to the Bowden cable lever (12) also moves.

Figure 3:
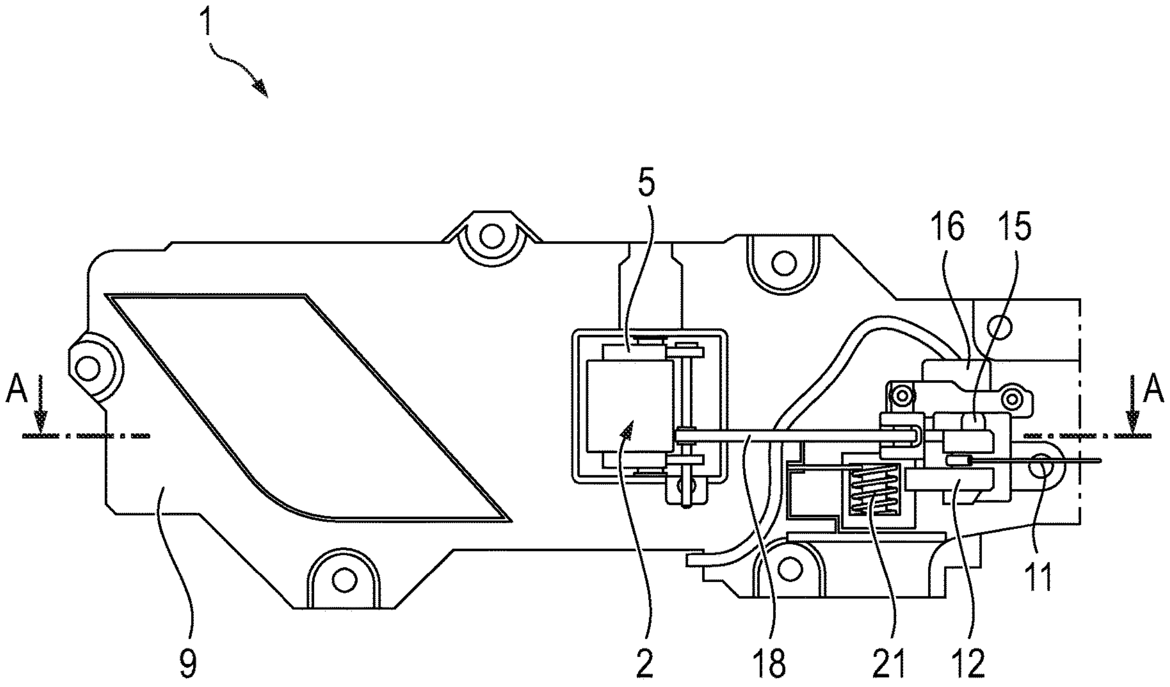
FIG. 3 is a rear view of the device from FIG. 1.

FIG. 3 shows a rear view of the device from FIG. 1. When the device for door unlocking (1) is actuated, the actuating element (2) is pulled. A spring (21) is arranged between the base plate (9) and/or the door and the loop lever (5) or the Bowden cable lever (12) for retrieving the actuating element (2). The spring (21) is tensioned when the actuating element (2) is pulled and brings the actuating element (2) back into the home position after the actuation. A microswitch (16) and a microswitch cable (17) for transmitting signals are arranged on the base plate (9). The Bowden cable lever (12) has a first cam (15) at the top for actuating the microswitch (16).

Figure 4:
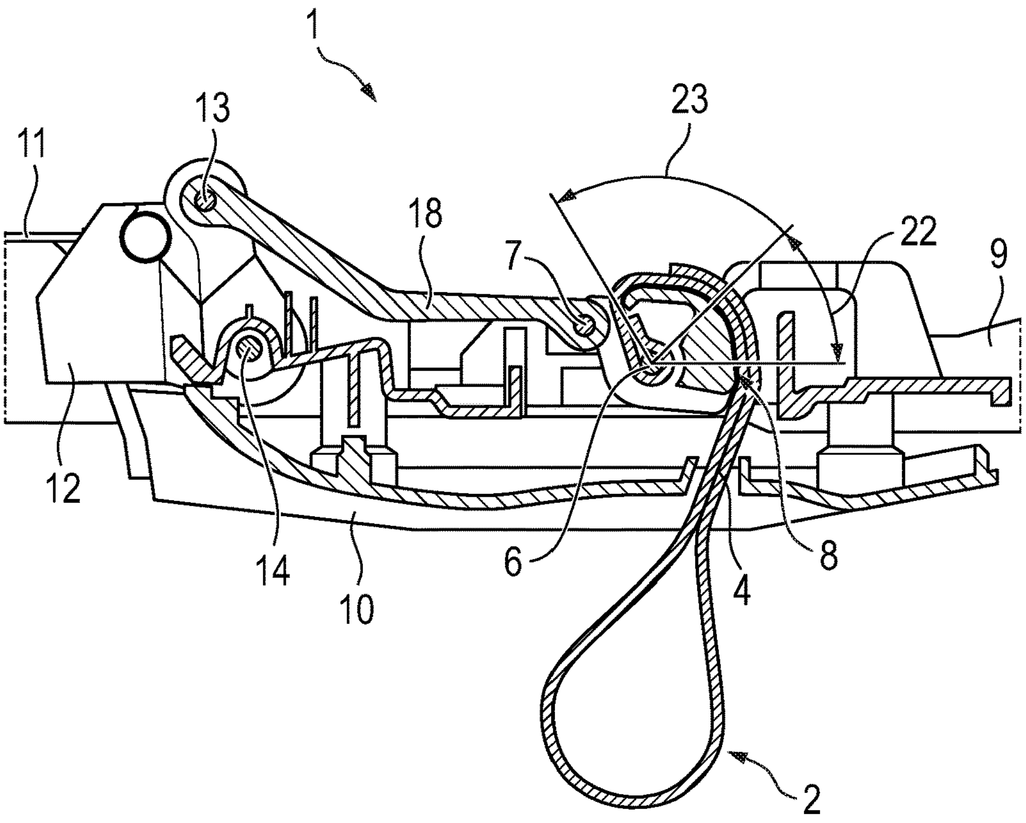
FIG. 4 is a sectional view of the device in a non-actuated stated through the sectional plane A-A depicted in FIG. 3.

FIG. 4 shows a sectional view of the device in the non-actuated state through the sectional plane A-A depicted in FIG. 3. The actuating element (2) is preferably formed from a flat band. With the first connection (3), preferably sewn, an actuating section (27) is configured for gripping on a first side of the actuating element (2). With a second connection (4), preferably sewn, on a second side of the actuating element (2) a band section (28) is configured on the first loop lever axis (6). To unlock the door, the actuating element (2) is pulled. Pulling on the actuating element (2) results in rotation of the loop lever (5) about the first loop lever axis (6). The band portion (28) of the actuating element (2) abuts the circular loop lever portion (8) upon rotation of the loop lever (5). When rotated about a first angle (22), the microswitch (16) is actuated by the first cam (15) of the Bowden cable lever (12). Upon a rotation of the Bowden cable lever (12) by a second angle (23) that is greater than the first angle (22), the door unlocking occurs mechanically via the Bowden cable (11).

Figure 5:
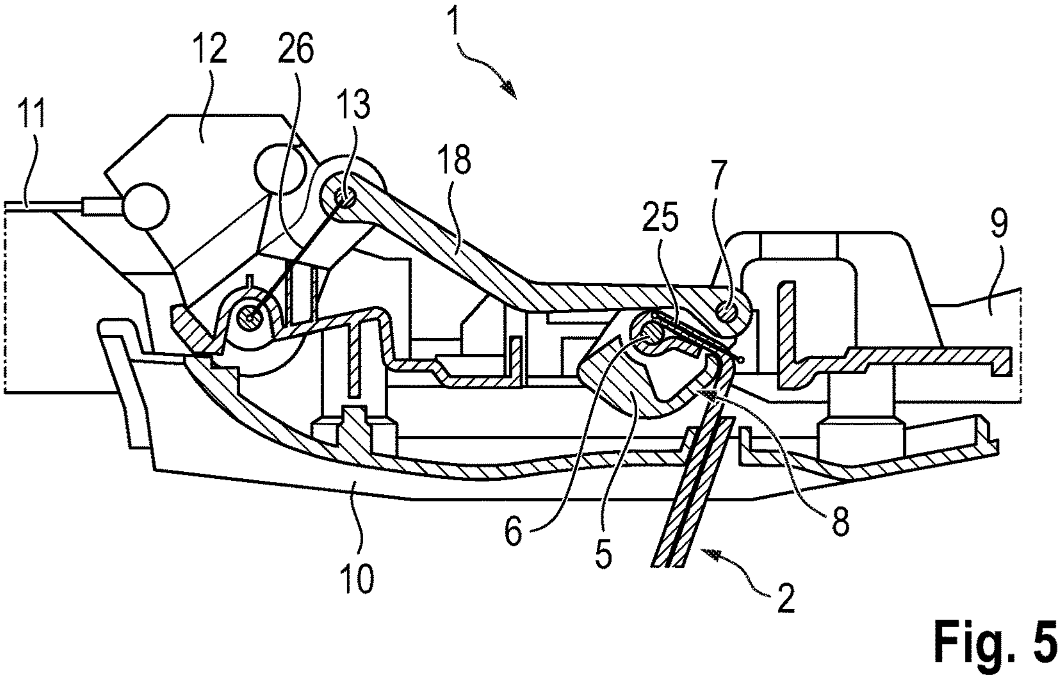
FIG. 5 is a sectional view of the device in the actuated stated through the sectional plane A-A depicted in FIG. 3.

FIG. 5 shows a sectional view of the device in the actuated state through the sectional plane A-A depicted in FIG. 3. The loop lever (5) comprises a first lever arm (25), and the Bowden cable lever (12) comprises a second lever arm (26).

Figure 6:
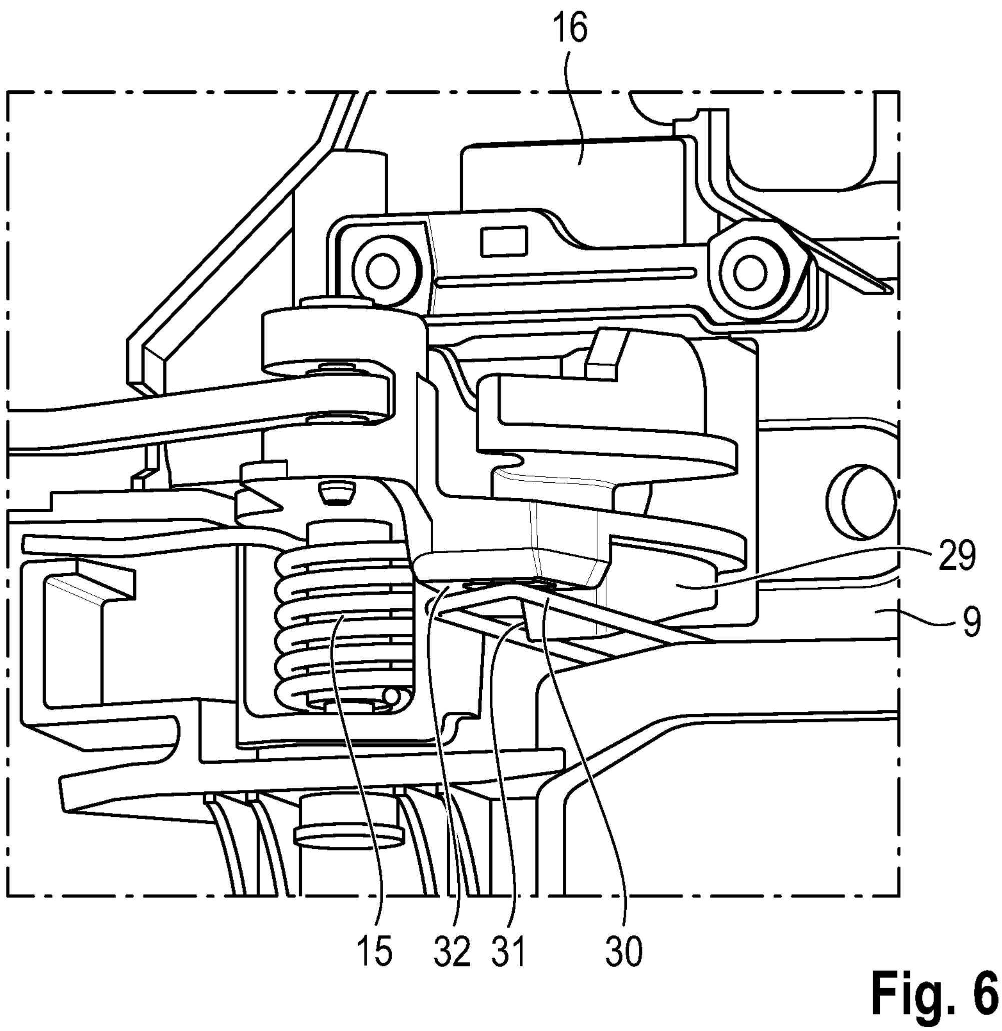
FIG. 6 is a perspective view of the device from FIG. 1.
Figure 7:
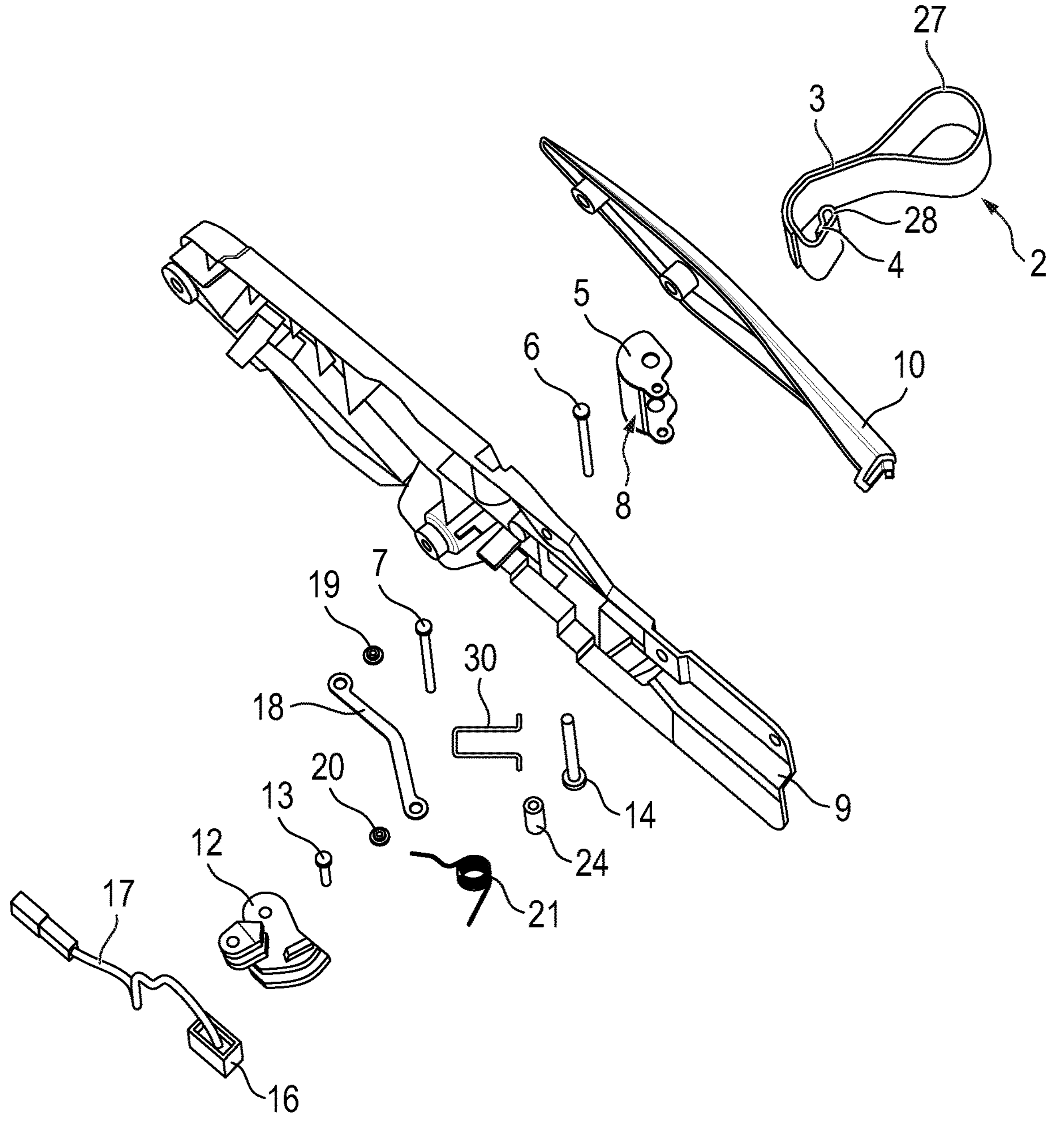
FIG. 7 is a perspective exploded view of the device from FIG. 1.

FIG. 6 shows a perspective view of a second spring (30) and a second cam (29). The second cam (29) is arranged on the Bowden cable lever bottom (32) and has a cam portion (31) facing away from the Bowden cable lever bottom (32). The second spring (30) has a U-shaped profile and is arranged on the base plate (9) and/or on the door. The closed portion of the second spring (30) abuts the Bowden cable lever bottom (32). When the loop lever (5) is actuated, a rotational movement of the Bowden cable lever (12) occurs about the second Bowden cable lever axis (14). The cam portion (31) rotates against the closed portion of the second spring (30). The second spring (30) cooperates with the cam portion (31) in such a way that, by applying a higher force, the second spring (30) slips over the cam portion (31) upon rotation of the Bowden cable lever (12) about the second Bowden cable lever axis (14), and the lock is mechanically unlocked upon further rotation. Also shown in FIG. 7 is a perspective exploded view of the individual components of the device from FIG. 1.

LIST OF REFERENCE NUMBERS

1 Device for door unlocking
2 Actuating element
3 First connection
4 Second connection
5 Loop lever
6 First loop lever axis
7 Second loop lever axis
8 Loop lever portion
9 Base plate
10 Cover
11 Bowden cable
12 Bowden cable lever
13 First Bowden cable lever axis
14 Second Bowden cable lever axis
15 First cam
16 Microswitch
17 Microswitch cable
18 Coupling rod
19 First coupling rod bearing bushing
20 Second coupling rod bearing bushing
21 First spring
22 First angle
23 Second angle
24 Bowden cable bearing bushing
25 First lever arm
26 Second lever arm
27 Actuating portion
28 Band portion
29 Second cam
30 Second spring
31 Cam portion
32 Bowden cable lever bottom

What is claimed is:

1. A device for unlocking a door of a vehicle, said device comprising:

a Bowden cable;

a strap including an actuating portion and a flexibly unwindable band portion, which is connected to the Bowden cable, and wherein the Bowden cable and the strap are arranged on a base plate of the vehicle, wherein the actuating portion and the band portion are integrated to form the strap as a monolithic strap, wherein the actuating portion includes a loop at a free end of the strap that is configured to be grasped by a user; and a loop lever including a loop lever portion, wherein the band portion is wound about a perimeter of the loop lever portion such that the band portion abuts the perimeter of the loop lever portion, wherein the strap and the Bowden cable are both connected to the loop lever in such a way that the Bowden cable moves when the loop lever is rotated by the strap when the strap is grasped and pulled by a user.

2. The device according to claim 1, further comprising a Bowden cable lever arranged in a rotatable manner on the base plate, wherein the Bowden cable lever is connected to the loop lever via a coupling rod in such a way that the Bowden cable lever moves when the loop lever is rotated by the strap when the strap is grasped and pulled by a user.

3. The device according to claim 2, further comprising a microswitch, which is actuable by a rotation of the Bowden cable lever by a first angle, in such a way that the unlocking of the door is controlled electrically.

4. The device according to claim 3, wherein, in case of a rotation of the loop lever or the Bowden cable lever by a second angle that is greater than the first angle, the unlocking of the door is carried out via the Bowden cable.

5. The device according to claim 2, further comprising a first spring arranged between (i) the base plate and (ii) the Bowden cable lever for retrieving the strap after the strap has been grasped and pulled by a user.

6. The device according to claim 5, further comprising (i) a second spring arranged on the base plate, and (ii) a second cam arranged on the Bowden cable lever that interacts with the second spring to provide a haptic force between mechanical and electrical door unlocking.

7. The device according to claim 2, wherein the coupling rod comprises at least one bend or a flexure.

8. The device according to claim 2, wherein the coupling rod is composed of either a metallic or a polymeric material.

9. The device according to claim 2, wherein (i) the loop lever portion is rotatable about a first axis, (ii) a first end of the coupling rod is rotatably mounted to the loop lever portion at a second axis that is spaced apart from the first axis, and (iii) a second end of the coupling rod is rotatably mounted to the Bowden cable lever at a third axis that is spaced apart from the first and second axes.

10. The device according to claim 9, wherein the Bowden cable lever includes a first portion that is rotatably connected to the second end of the coupling rod, and a second portion that is rotatably mounted to the base plate.

11. The device according to claim 10, further comprising (i) a spring arranged on the base plate, and (ii) a cam arranged on the Bowden cable lever that interacts with the spring to provide a haptic force when rotating the Bowden cable lever beyond a predetermined angle.

12. The device according to claim 1, wherein the strap is fastened to a shaft that extends along a first loop lever axis.

13. The device according to claim 1, wherein the loop lever portion is circular.

14. A vehicle door comprising the device of claim 1.

15. A vehicle comprising the vehicle door of claim 14.

16. The device according to claim 1, wherein the base plate is a separate plate that is mounted to the door.

17. The device according to claim 1, wherein the strap is composed of a textile material.

* * * * *